(12) United States Patent
Schaefer et al.

(10) Patent No.: US 8,766,562 B2
(45) Date of Patent: Jul. 1, 2014

(54) ADJUSTMENT DEVICE FOR ADJUSTING A RELATIVE ROTATIONAL ANGLE POSITION OF TWO SHAFTS AND METHOD FOR OPERATING AN ACTUATOR, PARTICULARLY OF SUCH AN ADJUSTMENT DEVICE

(75) Inventors: Jens Schaefer, Herzogenaurach (DE); Martin Steigerwald, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 349 days.

(21) Appl. No.: 13/131,097

(22) PCT Filed: Oct. 19, 2009

(86) PCT No.: PCT/EP2009/063648
§ 371 (c)(1),
(2), (4) Date: May 25, 2011

(87) PCT Pub. No.: WO2010/060691
PCT Pub. Date: Jun. 3, 2010

(65) Prior Publication Data
US 2011/0232402 A1 Sep. 29, 2011

(30) Foreign Application Priority Data
Nov. 25, 2008 (DE) .......................... 10 2008 059 005

(51) Int. Cl.
*H02K 7/10* (2006.01)
(52) U.S. Cl.
USPC ..................... 318/12; 318/254.1; 318/400.04; 318/400.08; 318/400.12; 73/331; 73/862

(58) Field of Classification Search
USPC ........... 318/12, 254.1, 400.4, 400.08, 400.12, 318/634; 123/90.15; 73/862.331, 862.332, 73/862, 331
See application file for complete search history.

(56) References Cited

U.S. PATENT DOCUMENTS

| | | | | |
|---|---|---|---|---|
| 5,905,366 A | * | 5/1999 | Wilson | 322/44 |
| 6,397,800 B2 | * | 6/2002 | Nohara et al. | 123/90.15 |
| 6,481,296 B2 | * | 11/2002 | Jin et al. | 73/862.331 |
| 6,575,128 B2 | * | 6/2003 | Nakamura et al. | 123/90.16 |
| 6,729,280 B2 | * | 5/2004 | Muraki | 123/90.15 |
| 6,925,893 B2 | * | 8/2005 | Abe et al. | 73/862.332 |

(Continued)

FOREIGN PATENT DOCUMENTS

| | | |
|---|---|---|
| DE | 103 15 871 A1 | 10/2004 |
| DE | 10 2005 021726 A1 | 11/2006 |

(Continued)

*Primary Examiner* — Paul Ip
(74) *Attorney, Agent, or Firm* — Davidson, Davidson & Kappel, LLC

(57) ABSTRACT

An adjustment device for adjusting a relative rotational angle position of two shafts (particularly a cam shaft and a crank shaft of an internal combustion engine) that has an adjusting gear which is designed as triple shaft gear and has a drive part connected to a first shaft (crank shaft), a driven part connected to a second shaft (cam shaft), and an adjustment shaft connected to a servomotor shaft of an electric servomotor in a rotationally fixed manner. In order to implement a wide temperature range for the operation of the adjustment device, a temperature sensor is arranged in the servomotor. In a method for operating an adjustment device or an actuator, the current of the servomotor or the actuator is controlled depending on the temperature that was determined earlier.

17 Claims, 2 Drawing Sheets

(56) References Cited

U.S. PATENT DOCUMENTS

| | | | |
|---|---|---|---|
| 7,121,153 B2* | 10/2006 | Abe et al. | 73/862.332 |
| 7,360,459 B2* | 4/2008 | Abe et al. | 73/862.332 |
| 7,511,438 B2* | 3/2009 | Melfi | 318/87 |
| 7,548,058 B2* | 6/2009 | Katoh | 324/207.21 |
| 7,605,551 B2* | 10/2009 | Atarashi et al. | 318/3 |
| 7,640,903 B2* | 1/2010 | Stork et al. | 123/90.17 |
| 7,685,994 B2* | 3/2010 | Mashiki et al. | 123/347 |
| 7,721,693 B2* | 5/2010 | Nguyen et al. | 123/90.17 |
| 7,762,221 B2* | 7/2010 | Kira | 123/90.17 |
| 7,806,093 B2* | 10/2010 | Wright | 123/90.17 |
| 8,001,851 B2* | 8/2011 | Abe et al. | 73/862.335 |
| 8,076,875 B2* | 12/2011 | Yoo et al. | 318/254.1 |
| 8,132,549 B2* | 3/2012 | Dell et al. | 123/90.17 |
| 2001/0004849 A1* | 6/2001 | Jin et al. | 73/862.331 |
| 2001/0025615 A1* | 10/2001 | Nohara et al. | 123/90.15 |
| 2001/0052331 A1* | 12/2001 | Nakamura | 123/90.17 |
| 2002/0035976 A1* | 3/2002 | Nakamura et al. | 123/90.15 |
| 2002/0056424 A1* | 5/2002 | Muraki | 123/90.15 |
| 2002/0078764 A1* | 6/2002 | Jin et al. | 73/862.331 |
| 2002/0111763 A1* | 8/2002 | Koga | 702/151 |
| 2002/0166524 A1* | 11/2002 | Nakamura et al. | 123/90.16 |
| 2003/0051562 A1* | 3/2003 | Jin et al. | 73/862.331 |
| 2003/0051563 A1* | 3/2003 | Jin et al. | 73/862.331 |
| 2004/0050180 A1* | 3/2004 | Abe et al. | 73/862.331 |
| 2005/0247140 A1* | 11/2005 | Abe et al. | 73/862.332 |
| 2007/0017305 A1* | 1/2007 | Abe et al. | 73/862.332 |
| 2007/0229062 A1* | 10/2007 | Katoh | 324/207.25 |
| 2007/0261670 A1* | 11/2007 | Nguyen et al. | 123/406.59 |
| 2008/0011256 A1* | 1/2008 | Wright | 123/90.17 |
| 2008/0245329 A1* | 10/2008 | Stork et al. | 123/90.17 |
| 2009/0139478 A1* | 6/2009 | Dell et al. | 123/90.31 |
| 2009/0205592 A1* | 8/2009 | Kira | 123/90.11 |
| 2009/0255510 A1* | 10/2009 | Mashiki et al. | 123/347 |
| 2009/0267548 A1* | 10/2009 | Yoo et al. | 318/400.4 |
| 2010/0019135 A1* | 1/2010 | Eckert et al. | 250/231.13 |

FOREIGN PATENT DOCUMENTS

| | | |
|---|---|---|
| EP | 1 071 194 A1 | 1/2001 |
| EP | 1 672 777 A2 | 6/2006 |
| JP | 2006 166666 A | 6/2006 |
| JP | 2006 223037 A | 8/2006 |
| JP | 2008 278596 A | 11/2008 |
| WO | 2004/035997 A1 | 4/2004 |

* cited by examiner

ADJUSTMENT DEVICE FOR ADJUSTING A RELATIVE ROTATIONAL ANGLE POSITION OF TWO SHAFTS AND METHOD FOR OPERATING AN ACTUATOR, PARTICULARLY OF SUCH AN ADJUSTMENT DEVICE

This application is a 371 of PCT/EP2009/063648 filed Oct. 19, 2009, which in turn claims the priority of DE 10 2008 059 005.3 filed Nov. 25, 2008, the priority of both applications is hereby claimed and both applications are incorporated by reference herein.

FIELD OF THE INVENTION

The invention concerns an adjusting device for adjusting the relative rotational angle position of two shafts of a triple shaft gear using an electric servomotor which adjusts an adjusting shaft. The invention further concerns a method for operating an actuator, particularly of said adjusting device.

BACKGROUND OF THE INVENTION

The invention relates in particular, but not exclusively, to electromechanical camshaft adjusters and will be described in the following with reference to such an adjuster. However, the method proposed by the invention can also be used with other actuators such as, for instance, brush-type motors or electromagnets.

In an electromechanical camshaft adjuster known from WO 2004/035997 A1, the adjusting gear comprises a double eccentric gear and a double planetary gear. Through the use of such an adjusting gear with a high reduction gear ratio, it is possible to use a servomotor in the form of a compact, high-speed brushless DC motor comprising a high-induction permanent magnet. The servomotor can be integrated in the camshaft adjuster or be made as a separate component.

As a rule, electromechanical camshaft adjusters installed in motor vehicles are operated in a very wide temperature range from −40° C. to +120° C. ambient temperature. Under extreme conditions, as encountered in very hot areas or under particularly high engine loading, the ambient temperatures at the electromotor can reach values of up to 150° C., and the temperature can rise even higher due to the electric and mechanical power dissipation of the motor.

This demands suitable measures that prevent an overheating of the electromotor while simultaneously guaranteeing the full functionality of the adjusting device in as wide a temperature range as possible.

The object of the invention is therefore to provide an electromechanical adjusting device for the relative rotational angle adjustment of two shafts using a triple shaft gear which permits a reliable adjustment in a wider temperature range and which is capable of at least maintaining a set rotational angle when there is a danger of overheating of individual components. A further object of the invention is to propose a method for operating an actuator, particularly an adjusting device for adjusting the rotational angle in a triple shaft gear, which method must also guarantee operation in a wide temperature range with a high degree of operational reliability.

SUMMARY OF THE INVENTION

An adjusting device, according to the invention, serves to adjust the relative rotational angle position of two shafts and is used as a camshaft adjuster in motor vehicles with internal combustion engines for adjusting the relative angular position between a crankshaft and a camshaft.

The adjusting device comprises an adjusting gear configured as a triple shaft gear comprising a driving part connected to a first shaft (crankshaft) and a driven part connected to a second shaft (camshaft) as well as an adjusting shaft connected to a servomotor shaft of an electric servomotor in a rotationally fixed manner.

The electric servomotor is preferably configured as a brushless DC motor and comprises, according to the invention, at least one temperature sensor.

In the simplest case, when the temperature sensor detects a danger of overheating, the electromotor is switched off.

In a particularly preferred form of embodiment of the invention, the adjusting device comprises a control unit for regulating the motor current or the pulse-duty factor as a function of the temperature determined by the temperature sensor in the servomotor or actuator.

In a method according to the invention, at first the actual temperature value is determined by means of the temperature sensor. This temperature value is then compared in the control unit with different temperature limit values deposited in an energization diagram or a pulse-duty factor diagram for the servormotor. Depending on the result of the comparison, the maximum current value or the maximum pulse-duty factor at which an overheating is excluded is defined for the further operation of the servomotor and regulated by the control unit.

The detection of the temperature can be performed at fixed or at variable intervals whose length depends on the actual temperature.

The different temperature limit values define different operational states. Until a first temperature limit value is reached, the servomotor operates in a normal state. As soon as a critical temperature limit value is reached, the servomotor is switched off in order to prevent an overheating and destruction.

In the range between the first temperature limit value and the critical temperature limit value, different control mechanisms can be realized depending on the type of motor or actuator used, which mechanisms limit, for example, the adjusting speed in order to reduce heat development in the servomotor. When the temperature in the servomotor falls again under a defined limit value, the energization can be correspondingly re-matched till the normal operation without current limitation is again possible.

Preferably, different modes of operation for different temperature ranges of the motor or the actuator are deposited in the energization diagram or the pulse-duty factor diagram. For instance, in certain temperature ranges, a linear, degressive or progressive reduction of the motor current is possible (or a reduction in correspondence with another function), while, in other ranges, the motor current can be reduced to a constant value.

The advantages of the invention of the invention are to be seen particularly in the fact that the servomotor or actuator can be brought to approach the temperature limits in a safe manner, so that an optimal operation is guaranteed even at higher temperatures.

The temperature sensor can advantageously be configured as a temperature-dependent resistor, in the present case, as a high-temperature conductor or as a low-temperature conductor. In such an embodiment, either a constant voltage is applied to the temperature sensor and the corresponding current is measured or, alternatively, a constant current is supplied to the temperature sensor and the voltage is measured. By setting off current and voltage against each other, the actual resistance of the temperature sensor is obtained. The actual temperature can be determined from a resistance-temperature characteristic curve.

It is, however, likewise possible to use other components that deliver a temperature-dependent signal like, for example, semiconductor temperature sensors, thermal sensors with quartz resonators, thermocouples or other temperature sensors. The temperature sensor is preferably arranged directly adjacent to the temperature-critical components (e.g., Hall sensors) or to the hottest point (e.g., motor winding) in the servomotor.

The control unit can be integrated in the servomotor or be configured separately as a component of the adjusting device.

BRIEF DESCRIPTION OF THE DRAWINGS

A particularly preferred form of embodiment of the invention will be described more closely in the following with reference to the appended drawing in which.

DETAILED DESCRIPTION OF THE INVENTION

Figure 1:
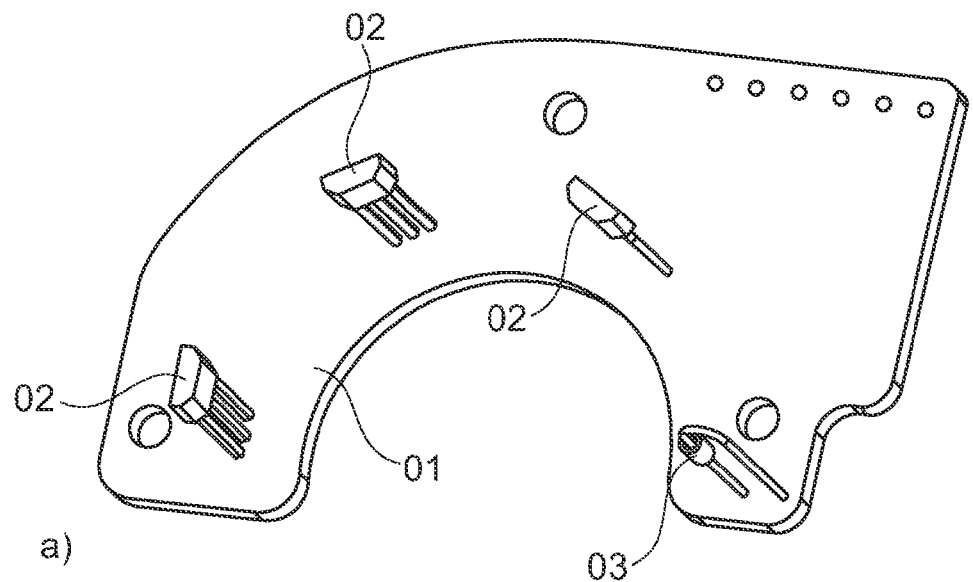
FIG. 1 shows spatial views of two forms of embodiment of the circuit board of a servomotor comprising a temperature sensor.
Figure 1:
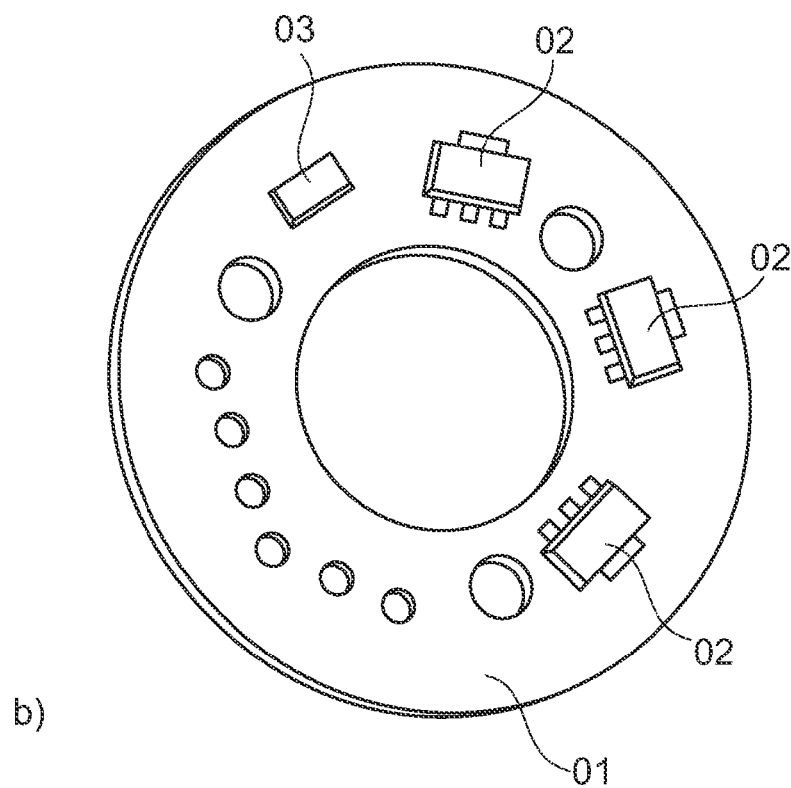

FIG. 1 shows in spatial views two forms of embodiment of a circuit board 01 of a brushless DC motor with electronic commutation. The electronic commutation is usually arranged on the circuit board 01 of such motors. Illustration a) of this figure shows a configuration with wired elements, whereas in illustration b) a circuit board with SMD elements is shown.

Three Hall sensors 02 serving as magnetic sensors are arranged angularly offset from each other on the circuit board 01. As known, these sensors serve for the position detection of the rotor for the purpose of electronic commutation. The phases can therefore be switched as a function of the position of the rotor. In other servormotors, position detection can also be performed through electric (potentiometers) or optical position sensors, The invention can likewise be applied to such other servomotors.

A temperature sensor 03 is likewise arranged on the circuit board 01. In the form of embodiment illustrated, the temperature sensor 03 is arranged adjacent to the temperature-critical Hall sensors 02. The temperature sensor 03 is connected to a control unit, not illustrated, which can be arranged inside or outside of the servomotor.

The circuit board can be configured in the present case as a PCB (printed circuit board).

For vibration protection, particularly in the wired configuration (Illustration a)), the temperature sensor 03 can be arranged with a holder on the circuit board 01 or be fixed in a corresponding reception in the stator. Alternatively, fixing can be performed by encapsulating the temperature sensor 03 or the sensor legs.

Figure 2:
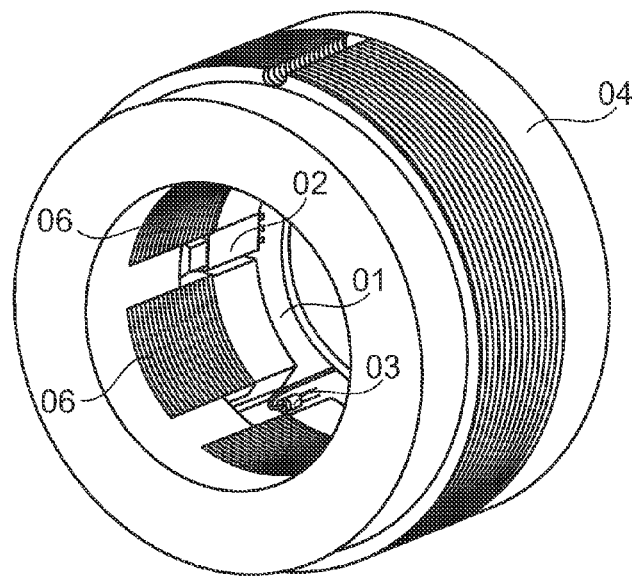
FIG. 2 shows a spatial view of a stator of a servomotor.

FIG. 2 shows a spatial illustration of a stator 04 of a brushless, electronically commutated servomotor. The circuit board 01 in the embodiment with wired elements is fixed to the stator 04 such that the Hall sensors 02 and the temperature sensor 03 are arranged between stator teeth 06. This arrangement is particularly compact and can be integrated into existing motor designs.

Figure 3:
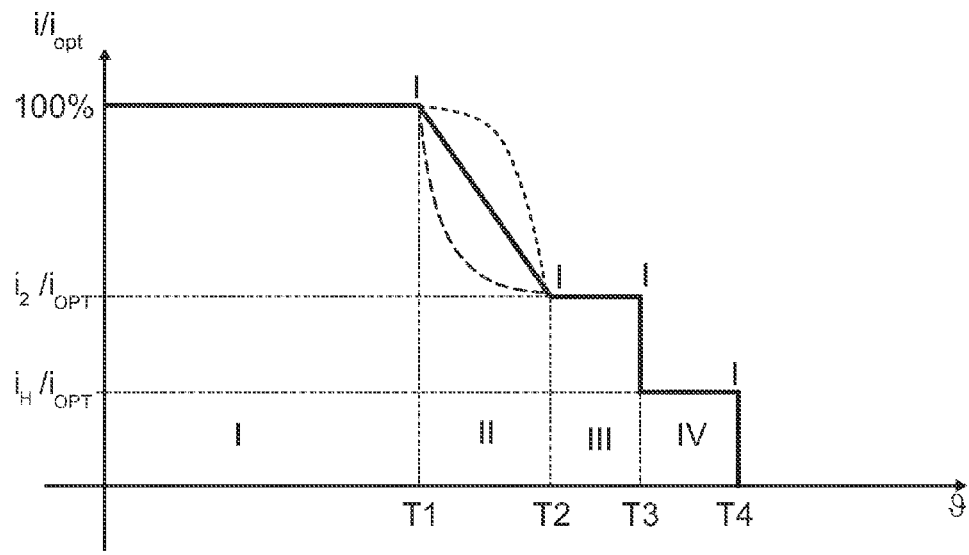
FIG. 3 shows an energization diagram for a method according to the invention for a temperature-dependent regulation of the energization of a servomotor, an adjusting device or an actuator.

FIG. 3 shows an energization diagram which can be implemented in a control unit. A particularly preferred type of temperature management will be described in the following with reference to this energization diagram.

The energization diagram shows the relationship between the actual motor current i to the motor current for optimal performance $i_{opt}$ as a function of the temperature 1 in the servomotor.

In a temperature range I, the servomotor is operated till a first temperature limit value is reached in a normal operation mode with a motor current i (or pulse-duty factor) that permits the completely unrestricted displacement behavior of the motor.

If the temperature $\vartheta$ in the servomotor rises above the first temperature limit value T1 up to a second temperature limit value T2 (temperature range II), the set motor current i (or pulse-duty factor) is reduced in a linear, degressive or progressive manner (or in correspondence with another function) relative to the temperature curve. With a reduced motor current in this range, a restricted adjusting behavior of the phase adjuster can be maintained. This means that the system adjusts with a reduced adjusting speed.

With a further rise of temperature up to a third temperature limit value T3 (temperature range III), the motor current i (or pulse-duty factor) is regulated to a value $i_2$ at which the camshaft can just about be adjusted. The minimum adjusting speed of the camshaft in this case is, for instance, 10° crankshaft/s.

If even this temperature limit value T3 is exceeded (temperature range IV), the motor is energized only with the holding current $i_H$ (or holding pulse-duty factor). In this case, the system can no longer be adjusted. The camshaft, however, is retained at a constant adjusted angle that permits a further operation of the internal combustion engine even if only under not optimal conditions.

In so far as a further temperature rise above a fourth temperature limit value T4 takes place, the electromotor is switched off in order to prevent its destruction.

When the determined temperature falls again below the respective temperature limit values T4 to T1, the energization (or pulse-duty factor) is re-matched accordingly till the normal operation can be resumed. For the falling-below the temperature limit values, the same limit values T1 to T4, or differing values in the sense of a temperature hysteresis, may be defined in order to prevent a "self-reinforcement" of the regulation.

A person skill d in the art can also modify the energization diagram. It is understood that other possibilities of current limitation (or pulse-duty factor limitation) also exist, for instance, a degressive limitation of the motor current in the temperature range II. Equally well, it would be possible to omit the temperature range III and continue current limitation (or pulse-duty factor limitation) up to the range of the holding current $i_H$ (or of the holding pulse-duty factor).

Further, it is also possible to monitor warming-up at low temperatures, e.g. −30°, and during a highly dynamic operation. At low ambient temperature, lumped temperature rises occur during a highly dynamic operation, e.g. the coils get heated up very fast due to the current, while the surrounding parts, e.g. the plastic sprayed coating is still cold (large temperature gradient). Therefore, the motor can be damaged due to the component loading resulting from the differing thermal expansion coefficients. This can be avoided by temperature monitoring and a corresponding energization because a more uniform temperature distribution during operation can be assured in this way (limitation of temperature gradient).

LIST OF REFERENCES

01 Circuit board
02 Hall sensor
03 Temperature sensor
04 Stator
05
06 Stator tooth
i Motor current
$i_2$ Reduced motor current
$i_H$ Holding current
$i_{opt}$ Motor current at optimal adjusting performance
$\vartheta$ Temperature in the servomotor
T1 Temperature limit value, first
T2 Temperature limit value, second
T3 Temperature limit value, third
T4 Temperature limit value, fourth
I, II, III, IV Temperature ranges

The invention claimed is:

1. A method of temperature-dependent regulation of energization of an adjusting device for adjusting a relative rotational angle position of a first shaft and a second shaft using an adjusting gear configured as a multi-shaft gear, comprising a driving part connected to the first shaft; a driven part connected to the second shaft; an electric servomotor having a servomotor shaft and temperature sensor; an adjusting shaft connected to the servomotor shaft of the electric servomotor in a rotationally fixed manner; and a control unit having a regulator for energizing the servomotor as a function of temperature determined by the temperature sensor, the method comprising the following steps:
   determining a temperature value in the adjusting device via the temperature sensor;
   comparing the temperature value with deposited temperature limit values, which distinguish different operation modes of the servomotor from one another; and
   regulating a current or a pulse-duty factor of the servomotor as a function of a result of the step of comparing to operate the servomotor in the operation modes.

2. The method according to claim 1, wherein the step of regulating switches operating modes when a first temperature limit value is exceeded.

3. The method according to claim 1, wherein the step of regulating comprises providing a separate current regulation or pulse-duty factor regulation for each of a first temperature range, a second temperature range, a third temperature range, and a fourth temperature range.

4. The method according to claim 3, wherein, when the step of comparing determines the temperature value in the second temperature range, the step of regulating performs a linear, degressive or progressive reduction of the current, which results in a reduced adjusting speed and/or an adjusting magnitude of the servomotor.

5. The method according to claim 4, wherein, when the step of comparing determines the temperature value in the third temperature range, the step of regulating regulates the current to a reduced value at which the servomotor is adjustable with a minimal adjusting speed.

6. The method according to claim 5, wherein, when the step of comparing determines the temperature value in the fourth temperature range, the step of regulating regulates the current to a holding current at which the actuator is no longer adjustable but is held at a constant position.

7. The method according to claim 6, wherein, when the step of comparing determines the temperature value above the fourth temperature range, the electromotor is switched off in order to prevent a destruction of the electromotor.

8. The method according to claim 3, wherein, when the step of comparing determines the temperature value in the third temperature range, the step of regulating regulates the current to a reduced value at which the servomotor is adjustable with a minimal adjusting speed.

9. The method according to claim 3, wherein, when the step of comparing determines the temperature value in the fourth temperature range, the step of regulating regulates the current to a holding current at which the actuator is no longer adjustable but is held at a constant position.

10. The method according to claim 3, wherein, when the step of comparing determines the temperature value above the fourth temperature range, the electromotor is switched off it order to prevent a destruction of the electromotor.

11. The method according to claim 1, wherein, when the step of comparing determines the temperature value below or around 0° C., the step of regulating performs a temperature gradient limitation in order to prevent a destruction of the electromotor.

12. In a servomotor for an adjusting device for adjusting a relative rotational angle position of a first shaft and a second shaft using, an adjusting gear configured as a multi-shaft gear having a driving part connected to the first shaft, a driven part connected to the second shaft, and an adjusting shaft, the servomotor having a stator, a rotor, and a servomotor shaft connected to the rotor, the adjusting shaft being connected to the servomotor shaft in a rotationally fixed manner, the improvement comprising:
   a temperature sensor; and
   a control unit having a regulator for energizing the servomotor as a function of a temperature determined by the temperature sensor, the regulator performing a comparison of the temperature determined by the temperature sensor with deposited temperature limit values, which distinguish different operating modes of the servomotor from one another, and regulating a current or pulse-duty factor of the servomotor as a function of a result of the comparison to operate the servomotor in the operation modes.

13. The servomotor according to claim 12, wherein the temperature sensor is a low-temperature conductor or a high-temperature conductor.

14. The servomotor according to claim 12, wherein the temperature sensor is arranged adjacent to temperature-critical components and/or at a hottest point in the servomotor.

15. The servomotor according to claim 12, wherein the servomotor is a brushless DC motor having, at least one Hall sensor arranged on a circuit board, the temperature sensor being arranged adjacent to the Hall sensor on the circuit board.

16. The servomotor according to claim 15, wherein the Hall sensor and the temperature sensor, which are integrated in the servomotor, are configured as surface-mounted components and/or as wired components.

17. The servomotor according to claim 15, wherein the temperature sensor is fixed, uncoupled from vibrations, on the circuit board or on the stator.

* * * * *